US010167749B2

(12) United States Patent
Yamaguchi (10) Patent No.: US 10,167,749 B2
(45) Date of Patent: Jan. 1, 2019

(54) VARIABLE VALVE MECHANISM OF INTERNAL COMBUSTION ENGINE

(71) Applicant: OTICS CORPORATION, Nishio-shi (JP)

(72) Inventor: Koki Yamaguchi, Nishio (JP)

(73) Assignee: OTICS CORPORATION, Nishio-Shi, Aichi-Ken (JP)

(*) Notice: Subject to any disclaimer, the term of this patent is extended or adjusted under 35 U.S.C. 154(b) by 81 days.

(21) Appl. No.: 15/479,104

(22) Filed: Apr. 4, 2017

(65) Prior Publication Data

US 2017/0342874 A1 Nov. 30, 2017

(30) Foreign Application Priority Data

May 30, 2016 (JP) ................. 2016-107146

(51) Int. Cl.
| F01L 1/34 | (2006.01) |
| F01L 13/00 | (2006.01) |
| F01L 1/047 | (2006.01) |
| F02D 13/02 | (2006.01) |
| F01L 1/12 | (2006.01) |
| F01L 1/18 | (2006.01) |

(52) U.S. Cl.
CPC ........... F01L 13/0026 (2013.01); F01L 1/047 (2013.01); F01L 1/12 (2013.01); F01L 13/0063 (2013.01); F02D 13/0207 (2013.01); F02D 13/0211 (2013.01); F01L 1/185 (2013.01); F01L 2013/0068 (2013.01); F01L 2105/00 (2013.01); F02D 2013/0296 (2013.01); Y02T 10/18 (2013.01)

(58) Field of Classification Search
CPC ....... F01L 13/0026; F01L 1/185; F01L 1/047; F01L 2105/00; F01L 1/12; F01L 13/0063; F01L 2013/0068; F02D 13/0207; F02D 2013/0296; F02D 13/0211; Y02T 10/18
See application file for complete search history.

(56) References Cited

U.S. PATENT DOCUMENTS

| 2013/0247851 A1 | 9/2013 | Christgen et al. |
| 2015/0075466 A1* | 3/2015 | Trzmiel ............. F01L 1/185 |
| | | 123/90.16 |

FOREIGN PATENT DOCUMENTS

| JP | H 06-159018 A | 6/1994 |
| JP | 2007-309272 A | 11/2007 |

* cited by examiner

*Primary Examiner* — Zelalem Eshete
(74) *Attorney, Agent, or Firm* — McGinn IP Law Group, PLLC.

(57) ABSTRACT

A variable valve mechanism includes a variable arm including a first arm and a second arm. The second arm is pivotally supported so as to be swingable by a support shaft. A position of the support shaft is a position where, during a base circle phase, in side view, a second segment connecting an axis of a roller to an axis of the support shaft is longer than a first segment connecting the axis of the roller to an axis of a camshaft, and an angle of the second segment formed with respect to a third segment connecting the axis of the roller to a swing axis of a roller arm is 60° to 120° toward the camshaft. The second arm extends from the support shaft such that a distal end portion of the second arm protrudes in between a cam and the roller.

6 Claims, 11 Drawing Sheets

VARIABLE VALVE MECHANISM OF INTERNAL COMBUSTION ENGINE

TECHNICAL FIELD

The present invention relates to a variable valve mechanism that drives a valve of an internal combustion engine and changes the drive state of the valve in accordance with the operating condition of the internal combustion engine.

BACKGROUND ART

Figure 8:
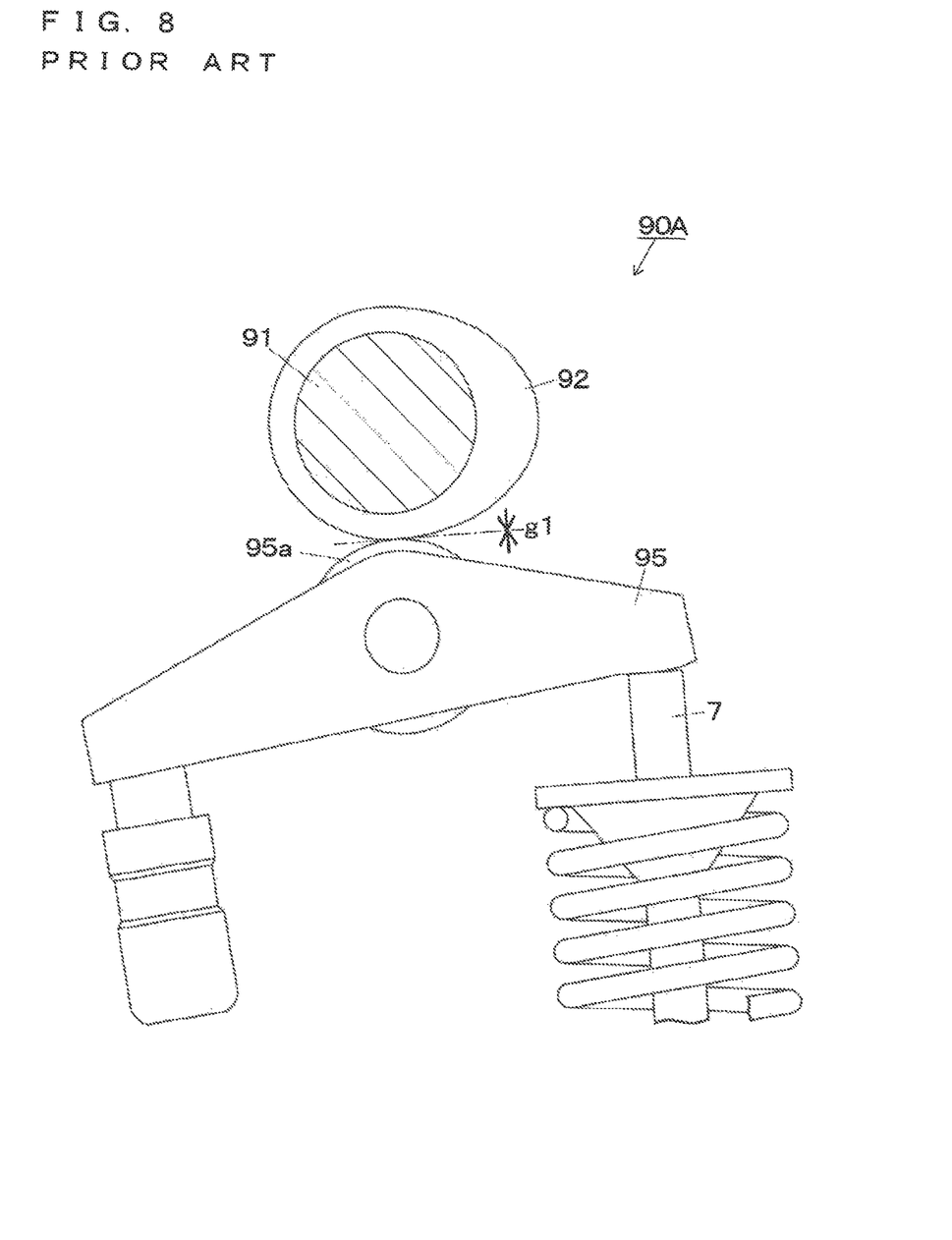
FIG. 8 is a side view illustrating a variable valve mechanism of a conventional example 1.

A valve mechanism 90A of a conventional example 1 (Patent Document 1) illustrated in FIG. 8 includes a cam 92 formed on a camshaft 91 and a roller arm 95 including a roller 95a and configured to swing to drive a valve 7 when the roller 95a is pressed by the cam 92.

Figure 9:
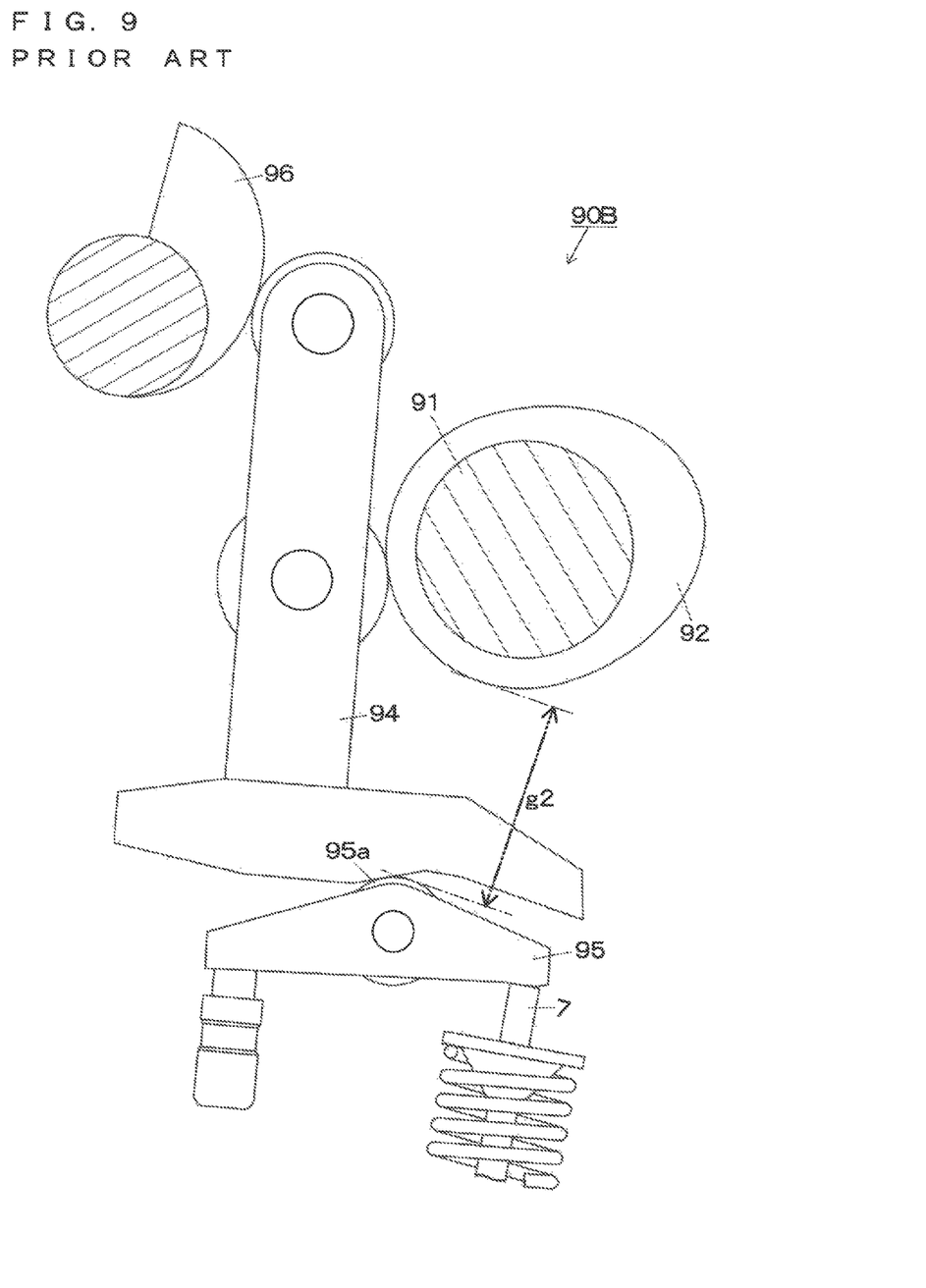
FIG. 9 is a side view illustrating a variable valve mechanism of a conventional example 2.
Figure 10:
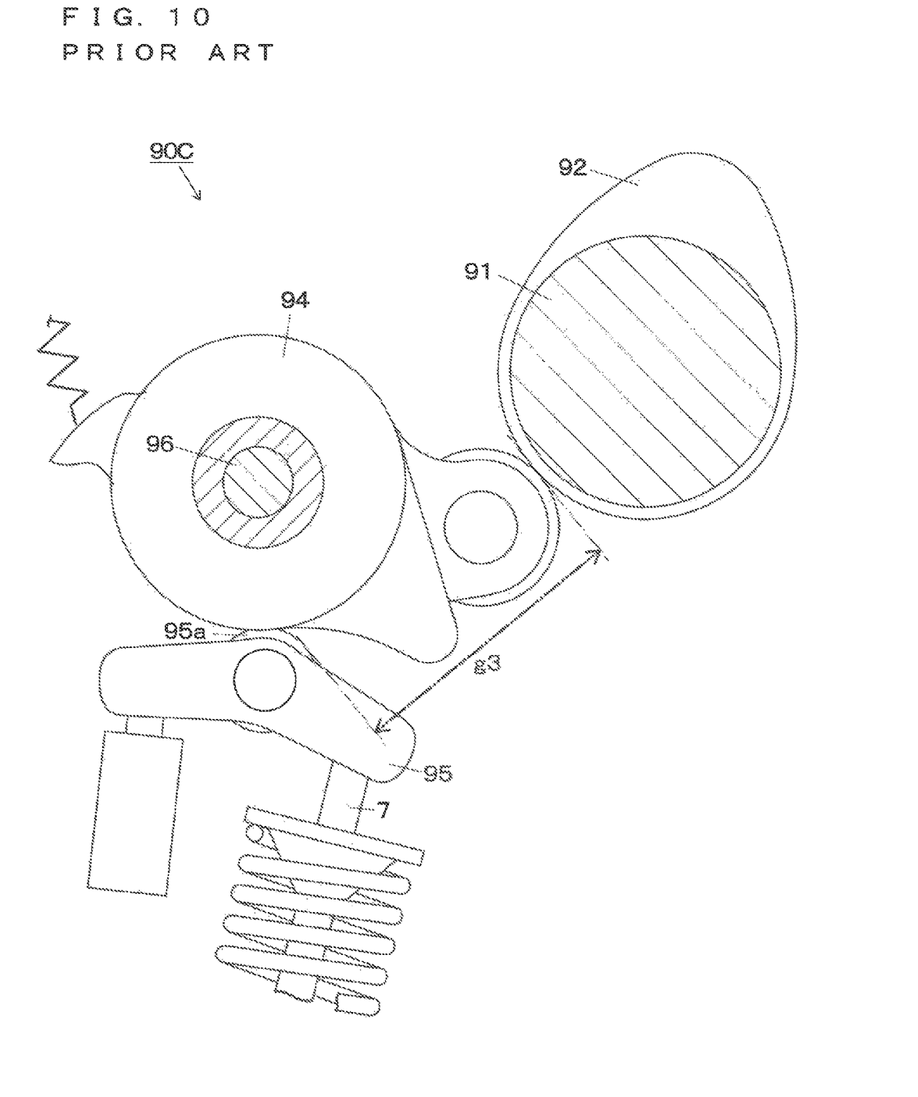
FIG. 10 is a side view illustrating a variable valve mechanism of a conventional example 3.

A variable valve mechanism 90B of a conventional example 2 (Patent Document 2) illustrated in FIG. 9 and a variable valve mechanism 90C of a conventional example 3 (Patent Document 3) illustrated in FIG. 10 are the same as that of the conventional example 1 in including the cam 92 and the roller arm 95, but are different therefrom in including a variable arm 94 interposed between the cam 92 and the roller 95a. The variable arm 94 is operated by a variable device 96, whereby the drive state (the lift amount and the action angle) of the valve 7 is continuously changed.

CITATION LIST

Patent Document

[Patent Document 1] Japanese Patent Application Publication No. H06-159018
[Patent Document 2] US Patent Application Publication No. 2013/0247851
[Patent Document 3] Japanese Patent Application Publication No. 2007-309272

SUMMARY OF INVENTION

Technical Problem

In the valve mechanism 90A of the conventional example 1, the drive state of the valve 7 cannot be changed. By contrast, in the variable valve mechanisms 90B and 90C of the conventional examples 2 and 3, the drive state of the valve 7 can be changed. However, between the cam 92 and the roller 95a, spaces g2 and g3 in which the variable arm 94 can be disposed need to be formed, respectively. Thus, when the variable valve mechanism 90B or 90C of the conventional example 2 or 3 is installed instead of the valve mechanism of the conventional example 1, in the space g1 between the cam 92 and the roller 95a depicted in FIG. 8, the space g2 or g3 depicted in FIG. 9 or FIG. 10 needs to be formed. This space can be formed to a certain extent by, for example, changing the shape of the roller arm 95, which cannot provide sufficient space in many cases. In such cases, the position of the camshaft 91 needs to be changed, which requires the cylinder head to be modified extensively.

Furthermore, in the variable valve mechanism 90B of the conventional example 2, three members 92, 95, and 96 that are the cam 92, the roller arm 95, and the variable device 96 surround the variable arm 94 from three directions, whereby the variable arm 94 is swingably supported. Thus, these three members 92, 95, and 96 need to be arranged so as to surround the variable arm 94 from three directions in a well-balanced manner, which reduces the flexibility of arrangement.

Figure 11A:
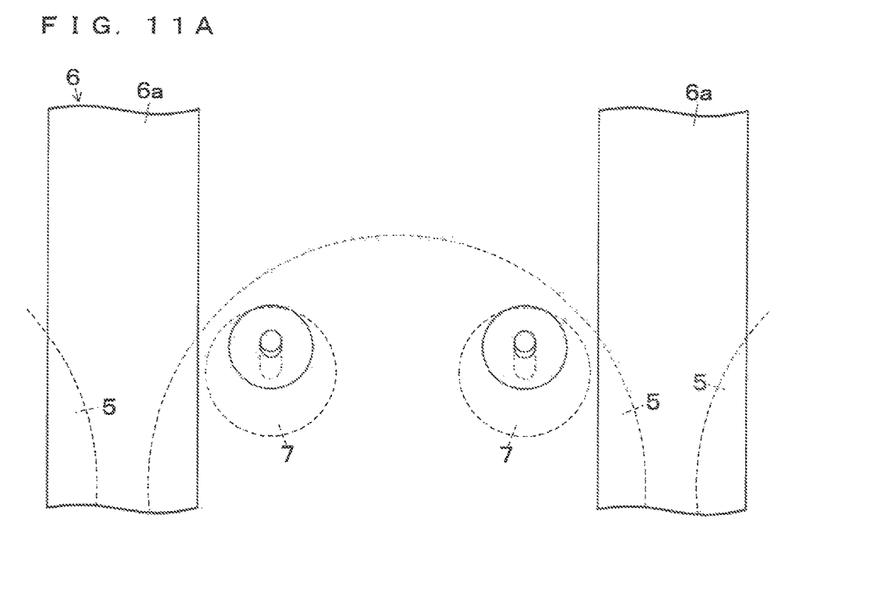
FIG. 11A is a plan view illustrating the cylinder head of the inter-bore journal bearing.
Figure 11B:
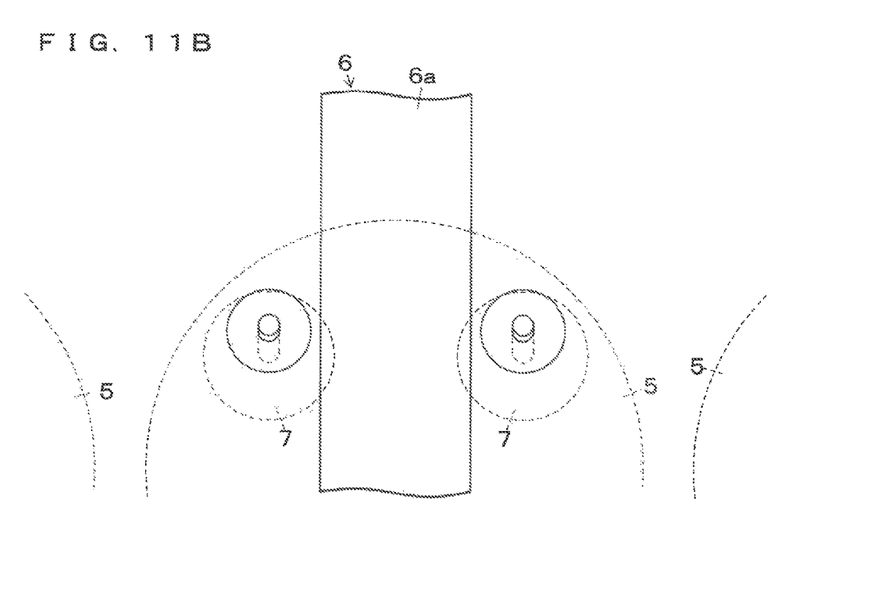
FIG. 11B is a plan view illustrating the cylinder head of the bore-center journal bearing.

Furthermore, in each of the variable valve mechanisms 90B and 90C of the conventional examples 2 and 3, one cam 92 presses two valves 7 positioned at both ends of a cylinder 5 via one variable arm 94 and two roller arms 95. Thus, there is no particular problem in the case of an inter-bore journal bearing in which journal bearings 6a that support the camshaft 91 are disposed directly above between the cylinders 5 (bores) as depicted in FIG. 11A. However, in the case of a bore-center journal bearing in which each journal bearing 6a is disposed directly above the center portion (between two valves 7) of the corresponding cylinder 5 (bore) as depicted in FIG. 11B, the corresponding variable arm 94 cannot be installed. This requires the bore-center journal bearing to be changed to the inter-bore journal bearing, which requires the cylinder head 6 to be modified extensively.

In view of this, it is a first object of the present invention, when a variable valve mechanism including a variable arm interposed between a cam and a roller is installed instead of a valve mechanism (e.g., the conventional example 1) including no variable arm interposed therebetween, to eliminate or minimize the necessity of changing the position of a camshaft and to provide flexibility in arrangement of the cam, a roller arm, and a variable device. Furthermore, it is a second object of the present invention to enable the variable valve mechanism to be installed even in the case of a bore-center journal bearing.

Solution to Problem

In order to achieve the first object, a variable valve mechanism of an internal combustion engine of the present invention is configured as follows. The variable valve mechanism includes: a cam formed on a camshaft; a roller arm including a roller and configured to swing to drive a valve when driving force is transmitted to the roller; a variable arm configured to transmit driving force of the cam to the roller; and a variable device configured to operate the variable arm to change a drive state of the valve.

The variable arm includes a first arm that is driven by the cam and a second arm to which the first arm is attached. The second arm is pivotally supported so as to be swingable by a support shaft at least an axis of which does not move with respect to a cylinder head of the internal combustion engine. A position of the support shaft is a position where, during a base circle phase in which a base circle of the cam acts, in side view when seen in a longitudinal direction of the camshaft, a second segment connecting an axis of the roller to the axis of the support shaft is longer than a first segment connecting the axis of the roller to an axis of the camshaft, and an angle of the second segment formed with respect to a third segment connecting the axis of the roller to a swing axis of the roller arm is 60° to 120° toward the camshaft. The second arm extends from the support shaft disposed in the position such that a distal end portion of the second arm protrudes in between the cam and the roller. The distal end portion moves in a reciprocating manner in a circumferential direction about the axis of the support shaft to press the roller when the second arm swings.

Herein, one cam may be configured to drive two or more valves via the variable arm and the roller arm. However, from the viewpoint of being able to achieve the second object (installable in the case of a bore-center journal bearing), it is preferable that the one cam drive only one valve via the variable arm and the roller arm, and that the one cam do not drive two or more valves.

Advantageous Effects of Invention

According to the present invention, the second arm of the variable arm extends from the support shaft disposed in the above-described position such that the distal end portion thereof protrudes in between the cam and the roller, and thus the second arm extends so as to surround the camshaft. Accordingly, a portion of the second arm that protrudes in between the cam and the roller is small. Thus, when the variable valve mechanism of the present invention is installed instead of a valve mechanism (e.g., the conventional example 1) including no variable arm interposed between the cam and the roller, the second arm can be installed without forming such a large space therebetween. Consequently, the position change of the camshaft can be minimized. In particular, when the second arm can be interposed simply in a space that can be formed by changing the shape of the roller arm, for example, the position change of the camshaft is not necessary.

Because the second arm of the variable arm is pivotally supported by the support shaft, unlike the conventional example 2, the variable arm does not have to be surrounded and supported from three directions in a well-balanced manner by three members of the cam, the roller arm, and the variable device. This increases the flexibility in arrangement of these three members.

Furthermore, when the preferable form (one cam drives only one valve) described above is used, neither the variable arm nor the roller arm extends over two or more valves. Thus, even in the case of a bore-center journal bearing in which each journal bearing is disposed between the corresponding valves, the variable valve mechanism of the present invention can be installed without a problem.

DESCRIPTION OF EMBODIMENTS

The length of the second segment is not limited to a particular length other than the above-described range (longer than the length of the first segment), and the angle of the second segment formed with respect to the third segment is not limited to a particular angle other than the above-described range (60° to 120°). However, the following length and the following angle are preferable in that the second arm is arranged so as to surround the camshaft more functionally. That is, the length of the second segment is preferably 1.2 times to 3 times longer than the length of the first segment, and is more preferably 1.4 times to 2.5 times longer. The angle of the second segment formed with respect to the third segment is preferably 60° to 100°, and is more preferably 65° to 90°.

The specific form of the variable device is not limited to a particular form, but the following form is exemplified. The variable device includes a control shaft that is provided so as to pivot in a controllable manner and a control cam formed on the control shaft. The control cam is in contact with the first arm.

The support shaft may be a rotational shaft that rotates about its axis or may be a fixed shaft that does not rotate, only if the axis does not move with respect to the cylinder head. However, the fixed shaft is preferable in being more stable.

Embodiment

An embodiment of the present invention will now be described. The present invention is not limited to the embodiment, and the configuration and shape of each part may be modified as desired without departing from the spirit and scope of the invention.

A variable valve mechanism 1 of the present embodiment illustrated in FIG. 1 to FIG. 7B periodically presses a valve 7 for intake or for exhaust to which a valve spring 8 is attached, thereby opening and closing the valve 7. The variable valve mechanism 1 includes a cam 20, a first arm 30, a second arm 40, a roller arm 50, and a variable device 60. The first arm 30 and the second arm 40 are variable arms 30 and 40, respectively. The roller arm 50 includes a roller 54.

[Cam 20]

Figure 1:
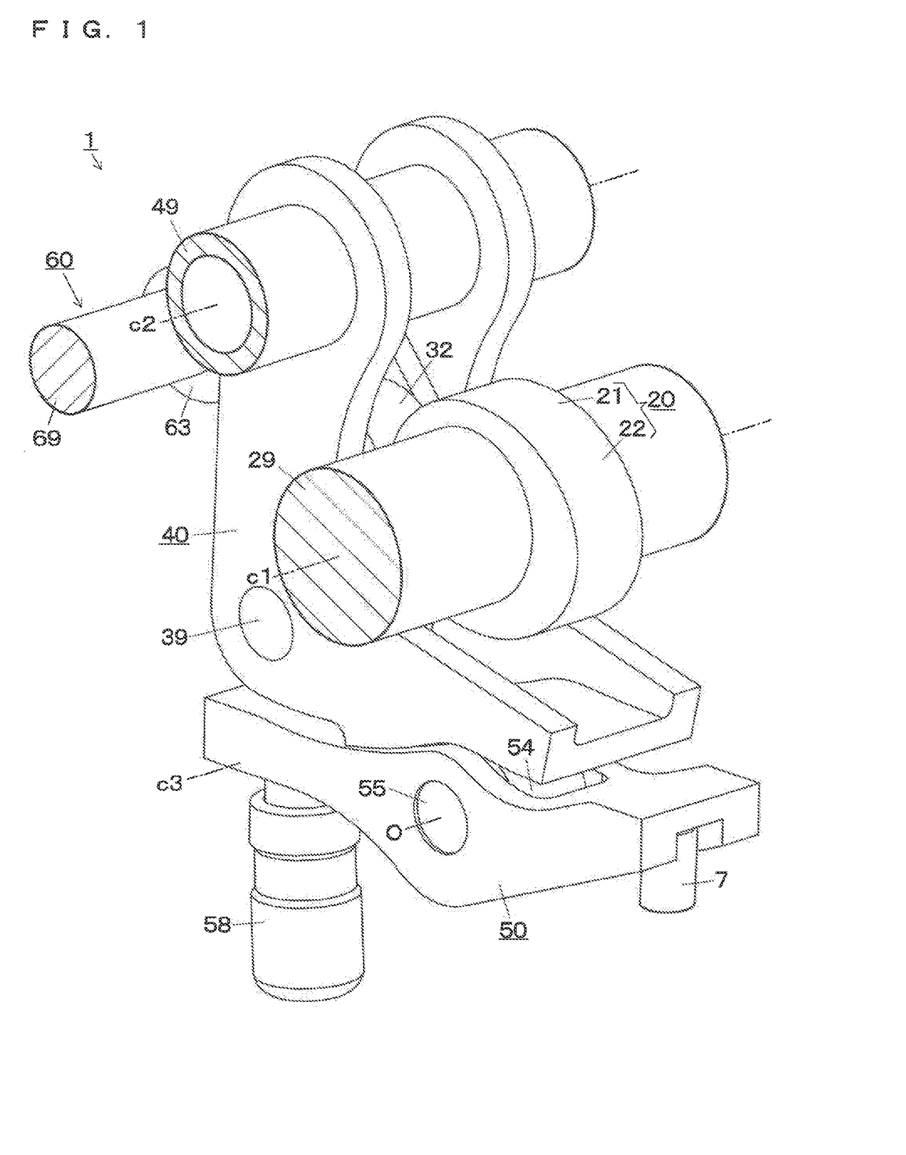
FIG. 1 is a perspective view of a variable valve mechanism according to an embodiment when viewed obliquely from front.
Figure 2:
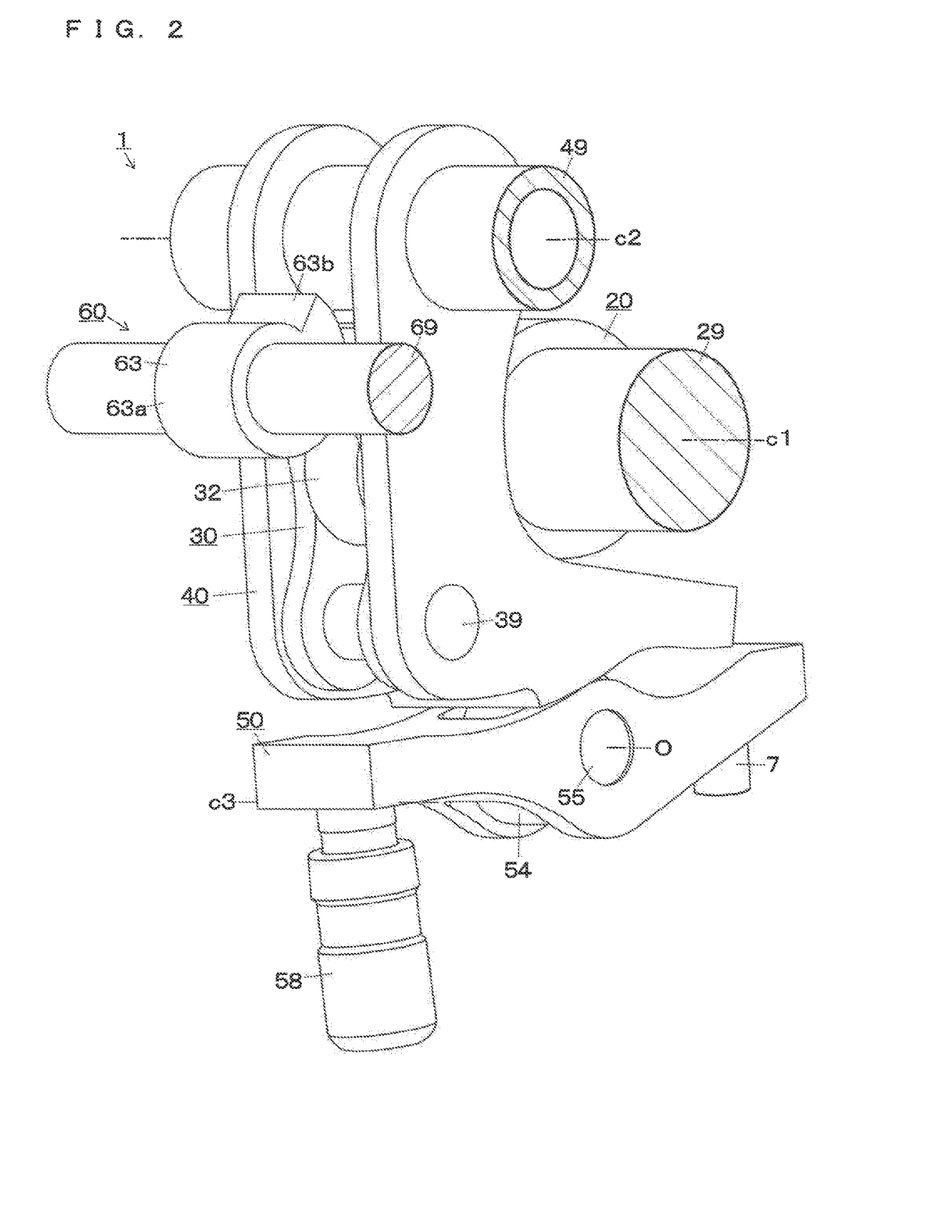
FIG. 2 is a perspective view of the variable valve mechanism when viewed obliquely from rear.
Figure 7A:
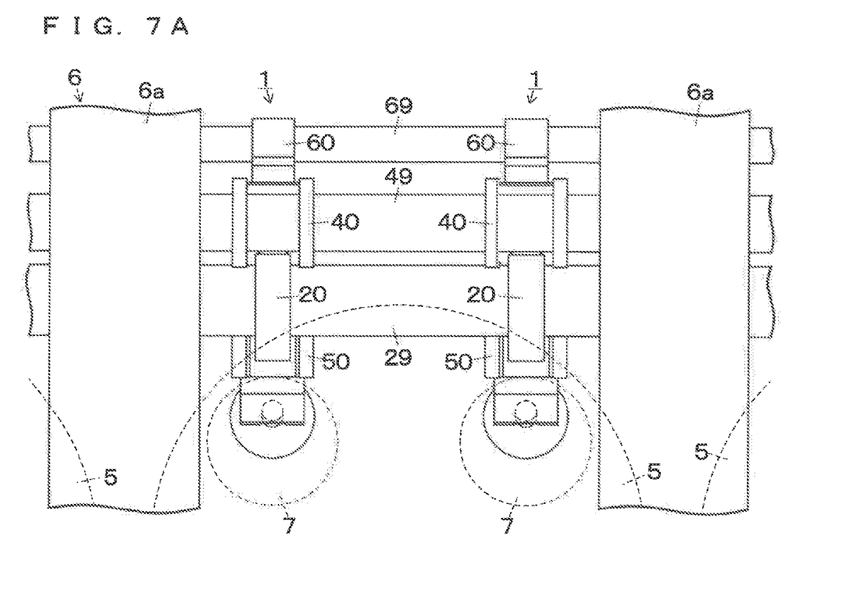
FIG. 7A is a plan view of the variable valve mechanism that is installed in a cylinder head of an inter-bore journal bearing.
Figure 7B:
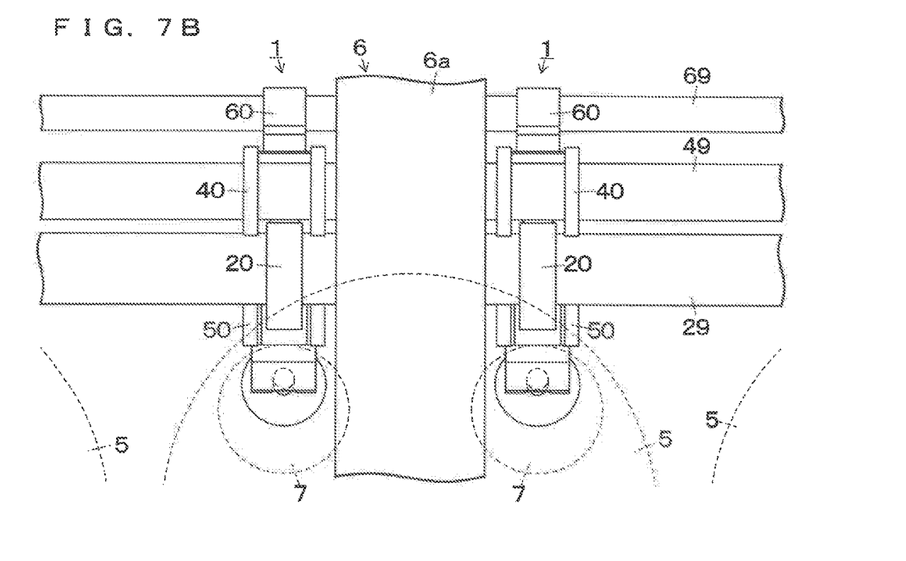
FIG. 7B is a plan view of the variable valve mechanism that is installed in a cylinder head of a bore-center journal bearing.

The cam 20 depicted in FIG. 1, etc. is formed on a camshaft 29 in a protruding manner. As depicted in FIGS. 7A, 7B, etc., the camshaft 29 is disposed through journal bearings 6a that are formed on a cylinder head 6 of an internal combustion engine in a protruding manner, and is rotatably supported by the journal bearings 6a. The journal bearings 6a may be of an inter-bore journal bearing in which the journal bearings are disposed directly above between cylinders 5 (bores) as depicted in FIG. 7A, or may be of a bore-center journal bearing in which each journal bearing is disposed directly above the center portion of the corresponding cylinder 5 (bore) (directly above between two valves 7) as depicted in FIG. 7B. The camshaft 29 rotates once every time the internal combustion engine rotates twice. In the following description and in the above "BRIEF DESCRIP- TION OF DRAWINGS", the time or a diagram when seen in the longitudinal direction of the camshaft 29 is called "in side view" or "a side view".

Figure 3:
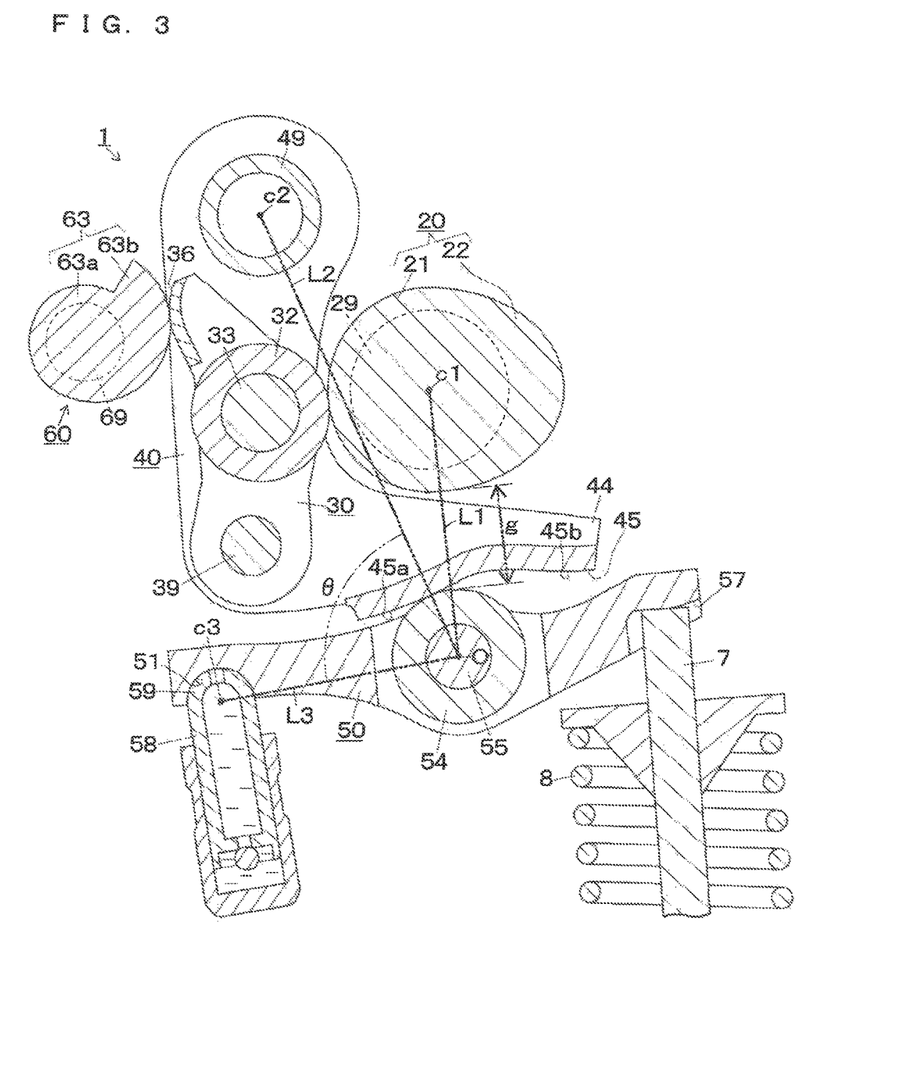
FIG. 3 is a side sectional view of the variable valve mechanism.
Figure 4A:
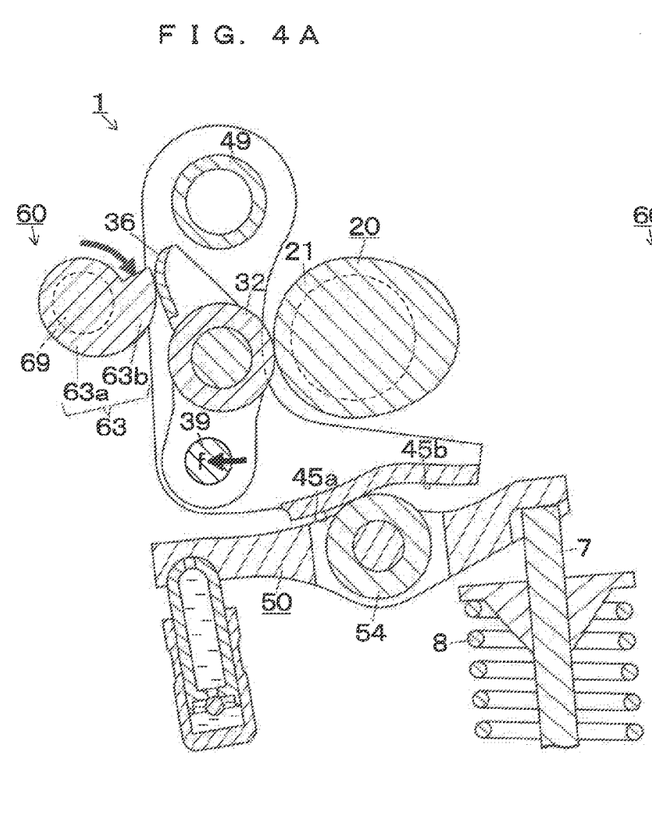
FIG. 4A is a side sectional view of the variable valve mechanism in a large-lift mode during a base circle phase.
Figure 4B:
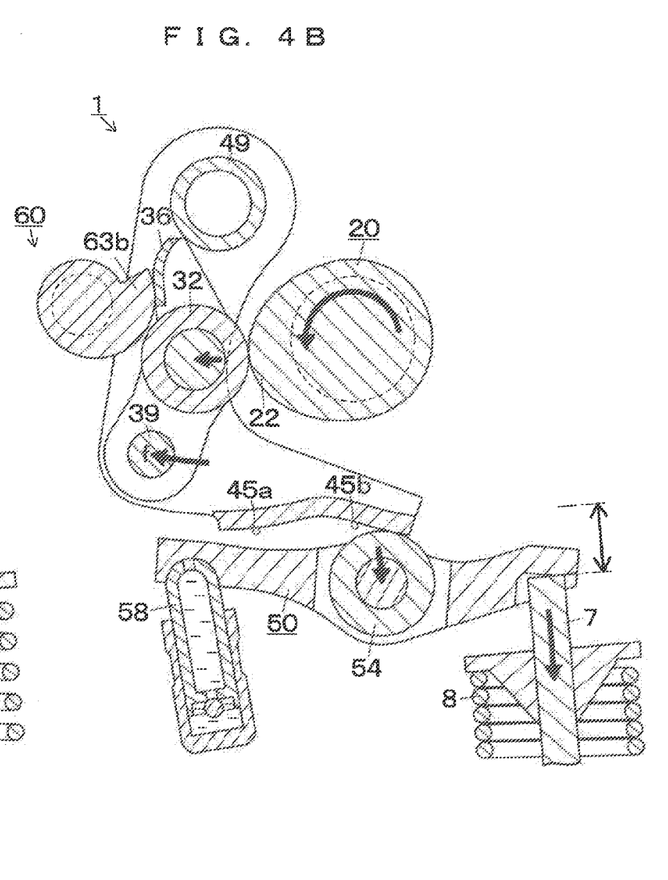
FIG. 4B is a side sectional view thereof at a nose top phase.
Figure 5A:
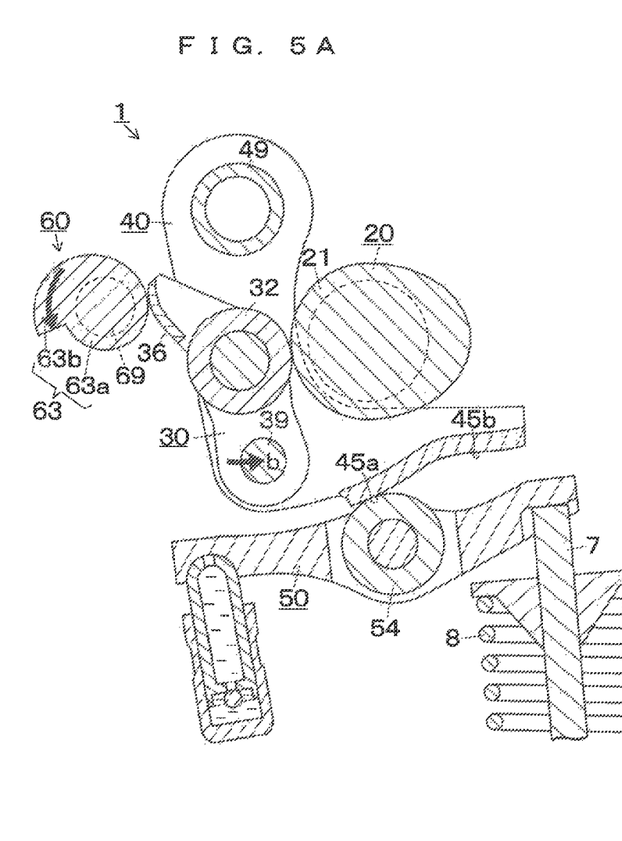
FIG. 5A is a side sectional view of the variable valve mechanism in a small-lift mode during the base circle phase.
Figure 5B:
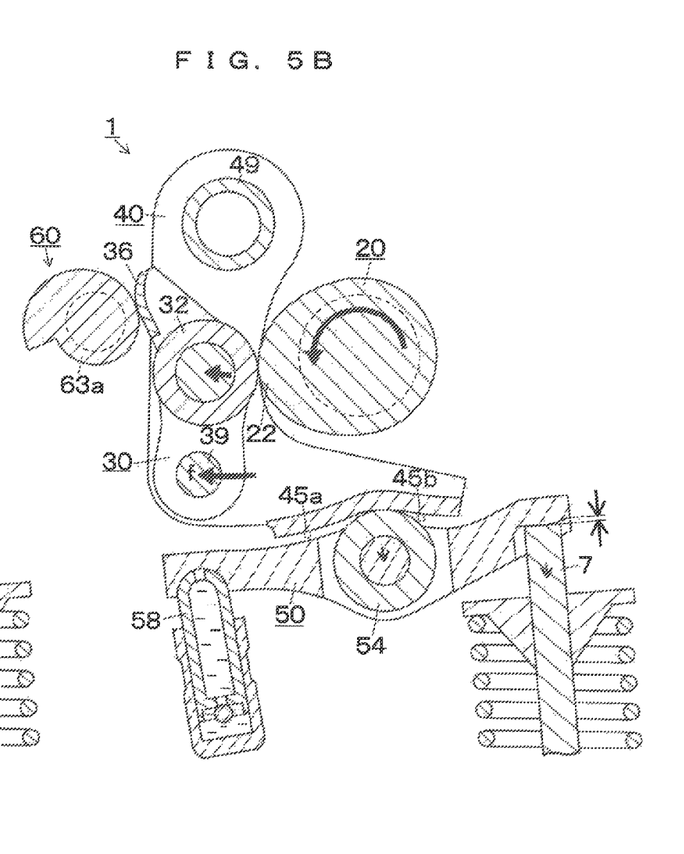
FIG. 5B is a side sectional view thereof at the nose top phase.
Figure 6:
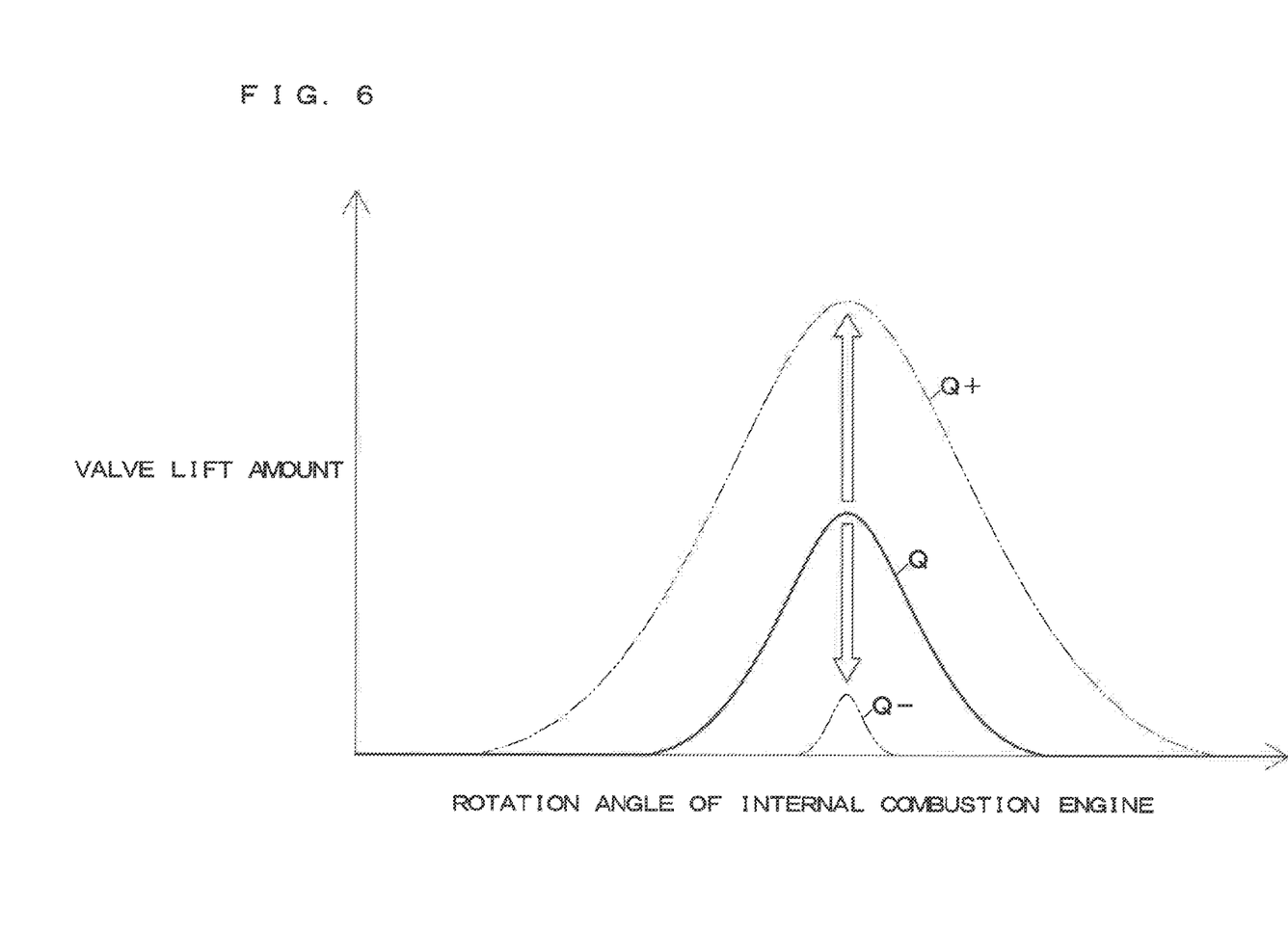
FIG. 6 is a graph representing the valve lift amount in the variable valve mechanism relative to the rotation angle of an internal combustion engine.

As depicted in FIG. 3, etc., the cam 20 includes a base circle 21 that is circular in side view and a nose 22 that protrudes from the base circle 21. In the following description and in the above "BRIEF DESCRIPTION OF DRAWINGS", the time when the base circle 21 of the cam 20 acts as depicted in FIG. 4A, FIG. 5A, etc. is called "base circle phase", and the time when the top portion of the nose 22 acts as depicted in FIG. 4B, FIG. 5B, etc. is called "nose top phase". Hereinafter, a segment connecting an axis O of the roller 54 to an axis c1 of the camshaft 29 in side view during the base circle phase depicted in FIG. 3, etc. is called "first segment L1".

[First Arm 30]

The first arm 30 depicted in FIG. 3, etc. transmits driving force of the cam 20 to the roller 54 in conjunction with the second arm 40. One end portion of the first arm 30 is attached to a longitudinally intermediate portion of the second arm 40 via a connecting shaft 39 so as to be relatively swingable. To a longitudinally intermediate portion of the first arm 30, a roller-like follower 32 that is in contact with the cam 20 is rotatably attached via a shaft 33. On the other end portion of the first arm 30, a contact surface 36 that is in contact with a control cam 63 of the variable device 60 is formed.

[Second Arm 40]

The second arm 40 depicted in FIG. 3, etc. is pivotally supported by a support shaft 49 so as to be swingable. As depicted in FIGS. 7A, 7B, etc., the support shaft 49 is a fixed shaft that is disposed through the journal bearings 6a of the cylinder head 6 and is fixed to the journal bearings 6a. Hereinafter, a segment connecting the axis O of the roller 54 to the axis c2 of the support shaft 49 in side view during the base circle phase depicted in FIG. 3, etc. is called "second segment L2". In the present embodiment, the length of the second segment L2 is 1.6 times to 1.8 times longer than the length of the first segment L1. Hereinafter, out of circumferential directions about the axis c2 of the support shaft 49, a direction in which the second arm 40 presses the valve 7 via the roller arm 50 to open the valve is called "lift direction f", and a direction opposite thereto is called "return direction b".

As depicted in FIG. 3, etc., the second arm 40 extends from the support shaft 49 such that a distal end portion 44 thereof protrudes in between the cam 20 and the roller 54, and thus extends so as to surround the camshaft 29. On a lower portion of the distal end portion 44, a pressing surface 45 for pressing the roller 54 is formed. When the second arm 40 swings, the distal end portion 44 moves in a reciprocating manner in a circumferential direction about the axis c2 of the support shaft 49 to press the roller 54 with the pressing surface 45. The pressing surface 45 has a second base circle 45a that extends in a circumferential direction about the axis c2 of the support shaft 49 and a second nose 45b that protrudes from the second base circle 45a in a direction apart from the support shaft 49.

[Roller Arm 50]

To a longitudinally intermediate portion of the roller arm 50 depicted in FIG. 3, etc., the roller 54 is rotatably attached via a roller shaft 55. On a distal end portion of the roller arm 50, a drive surface 57 for pressing the valve 7 is formed. On a lower surface of a base end portion of the roller arm 50, a hemispherical recessed portion 51 having a shape hemispherically recessed upward is recessed. The hemispherical recessed portion 51 is mounted on a hemispherical portion 59 that is an upper end portion of a lash adjuster 58. Thus, the roller arm 50 is supported so as to be swingable about an axis line (swing axis c3) that extends through the spherical center of the hemispherical portion 59 in the longitudinal direction of the camshaft 29. When driving force is transmitted to the roller 54, the roller arm 50 swings to drive the valve 7. Hereinafter, a segment connecting the axis O of the roller 54 to the swing axis c3 of the roller arm in side view during the base circle phase is called "third segment L3". In the present embodiment, the angle θ of the second segment L2 formed with respect to the third segment L3 is about 70° to 80° toward the camshaft 29.

[Variable Device 60]

The variable device 60 depicted in FIG. 3, etc. operates the first arm 30 to continuously change the lift amount and the action angle of the valve 7. The variable device 60 includes a control shaft 69 that is provided so as to pivot in a controllable manner and the control cam 63 formed on the control shaft 69. The control cam 63 is configured to rotate together with the control shaft 69, and is in contact with the contact surface 36 of the first arm 30. The control cam 63 has a control base circle 63a that is circular in side view and a control nose 63b that protrudes from the control base circle 63a.

As depicted in FIG. 4A, when the control shaft 69 and the control cam 63 pivot in one direction (clockwise in FIG. 4A), the control nose 63b presses the contact surface 36 of the first arm 30, whereby the position of the contact surface 36 shifts in a direction apart from the control shaft 69. Accordingly, the position of the second arm 40 during the base circle phase shifts in the lift direction f within a range in which the second base circle 45a is in contact with the roller 54. Accordingly, as depicted in FIG. 4B, the position of the second arm 40 at the nose top phase in which the second arm 40 moves most in the lift direction f also shifts in the lift direction f within a range in which the second nose 45b is in contact with the roller 54. Consequently, the lift amount and the action angle of the valve 7 increase. Specifically, for example, the lift curve Q indicated by the continuous line in FIG. 6 continuously changes to the lift curve Q+ indicated above by a long dashed double-short dashed line.

Conversely, as depicted in FIG. 5A, when the control shaft and the control cam 63 pivot in the other direction (counterclockwise in FIG. 5A), the position of the contact surface 36 of the first arm 30 shifts in a direction closer to the control shaft 69. Accordingly, the position of the second arm 40 during the base circle phase shifts in the return direction b within a range in which the second base circle 45a is in contact with the roller 54. Accordingly, as depicted in FIG. 5B, the position of the second arm 40 at the nose top phase in which the second arm 40 moves most in the lift direction f also shifts in the return direction b. Consequently, the lift amount and the action angle of the valve 7 decrease. Specifically, for example, the lift curve Q indicated by the continuous line in FIG. 6 continuously changes to the lift curve Q− indicated below by a long dashed double-short dashed line.

According to the present embodiment, the following effects can be obtained.

[A] Because the second arm 40 of the variable arms 30 and 40 extends from the support shaft 49 so as to surround the camshaft 29 as depicted in FIG. 3, etc., a portion of the second arm 40 that protrudes in between the cam 20 and the roller 54 is small. Thus, even when the space g between the cam 20 and the roller 54 is small, the second arm 40 can be installed. Thus, for example, when the variable valve mechanism 1 of the present embodiment is installed instead of the valve mechanism 90A of the conventional example 1 depicted in FIG. 8 that includes no variable arm interposed therebetween, the second arm 40 can be interposed simply in the space g between the cam 20 and the roller 54 that can be formed by changing the shape of the roller arm 95 from the state of the conventional example 1 depicted in FIG. 8 to the shape of the roller arm 50 of the present embodiment depicted in FIG. 3, etc. Consequently, the position change of the camshaft 29 (camshaft 91) is not necessary. The position change of the lash adjuster 58 (the swing axis c3 of the roller arm 50) and the valve 7 (stem end) is also not necessary. Thus, by minimally changing the structure from the state of the conventional example 1 depicted in FIG. 8, the variable valve mechanism 1 of the present embodiment depicted in FIG. 3, etc. can be installed in a simple manner at low cost.

[B] Because the second arm 40 of the variable arms 30 and 40 is pivotally supported by the support shaft 49 that is fixed to the cylinder head 6, unlike the conventional example 2, the variable arms 30 and 40 do not have to be surrounded and supported from three directions in a well-balanced manner by three members 20, 50, and 60 that are the cam 20, the roller arm 50, and the variable device 60. This increases the flexibility in arrangement of these three members 20, 50, and 60.

[C] Because one cam 20 drives only one valve 7 via one first arm 30, one second arm 40, and one roller arm 50, the variable valve mechanism 1 does not include a member that extends over two valves 7. Thus, not only in the case of the inter-bore journal bearing depicted in FIG. 7A, but also in the case of the bore-center journal bearing depicted in FIG. 7B, the variable valve mechanism 1 can be installed without a problem.

REFERENCE SIGNS LIST

1 Variable valve mechanism
6 Cylinder head
7 Valve
20 Cam
21 Base circle
29 Camshaft
30 First arm (Variable arm)
40 Second arm (Variable arm)
44 Distal end portion of second arm
49 Support shaft
50 Roller arm
54 Roller
60 Variable device
63 Control cam
63 Control shaft
O Axis of roller
c1 Axis of camshaft
c2 Axis of support shaft
c3 Swing axis of roller arm
L1 First segment
L2 Second segment
L3 Third segment
θ Angle of second segment formed with respect to third segment

The invention claimed is:

1. A variable valve mechanism of an internal combustion engine comprising:
    a cam formed on a camshaft;
    a roller arm including a roller and configured to swing to drive a valve when driving force is transmitted to the roller;
    a variable arm configured to transmit driving force of the cam to the roller; and
    a variable device configured to operate the variable arm to change a drive state of the valve, wherein
    the variable arm includes a first arm that is driven by the cam and a second arm to which the first arm is attached,
    the second arm is pivotally supported so as to be swingable by a support shaft at least an axis of which does not move with respect to a cylinder head of the internal combustion engine,
    a position of the support shaft is a position where, during a base circle phase in which a base circle of the cam acts, in side view when seen in a longitudinal direction of the camshaft, a second segment connecting an axis of the roller to the axis of the support shaft is longer than a first segment connecting the axis of the roller to an axis of the camshaft, and an angle of the second segment formed with respect to a third segment connecting the axis of the roller to a swing axis of the roller arm is 60° to 120° toward the camshaft, and
    the second arm extends from the support shaft disposed in the position such that a distal end portion of the second arm protrudes in between the cam and the roller, and the distal end portion moves in a reciprocating manner in a circumferential direction about the axis of the support shaft to press the roller when the second arm swings.

2. The variable valve mechanism of the internal combustion engine according to claim 1, wherein
    one cam drives only one valve via the variable arm and the roller arm, and
    the one cam does not drive two or more valves.

3. The variable valve mechanism of the internal combustion engine according to claim 1, wherein
    the variable device includes a control shaft that is provided so as to pivot in a controllable manner and a control cam formed on the control shaft, and
    the control cam is in contact with the first arm.

4. The variable valve mechanism of the internal combustion engine according to claim 1, wherein a pressing surface for pressing the roller is formed on a lower portion of the distal end portion of the second arm.

5. The variable valve mechanism of the internal combustion engine according to claim 4, wherein the pressing surface has a second base circle that extends in the circumferential direction about the axis of the support shaft and a second nose that protrudes from the second base circle in a direction apart from the support shaft.

6. The variable valve mechanism of the internal combustion engine according to claim 3, wherein
    one end portion of the first arm is attached to a longitudinally intermediate portion of the second arm so as to be relatively swingable,
    a roller-like follower that is in contact with the cam is rotatably attached to a longitudinally intermediate portion of the first arm, and
    a contact surface that is in contact with the control cam is formed on the other end portion of the first arm.

* * * * *